July 10, 1945.  C. R. ROCHE  2,380,074
FLUID FLYWHEEL TRANSMISSION
Filed Aug. 19, 1940
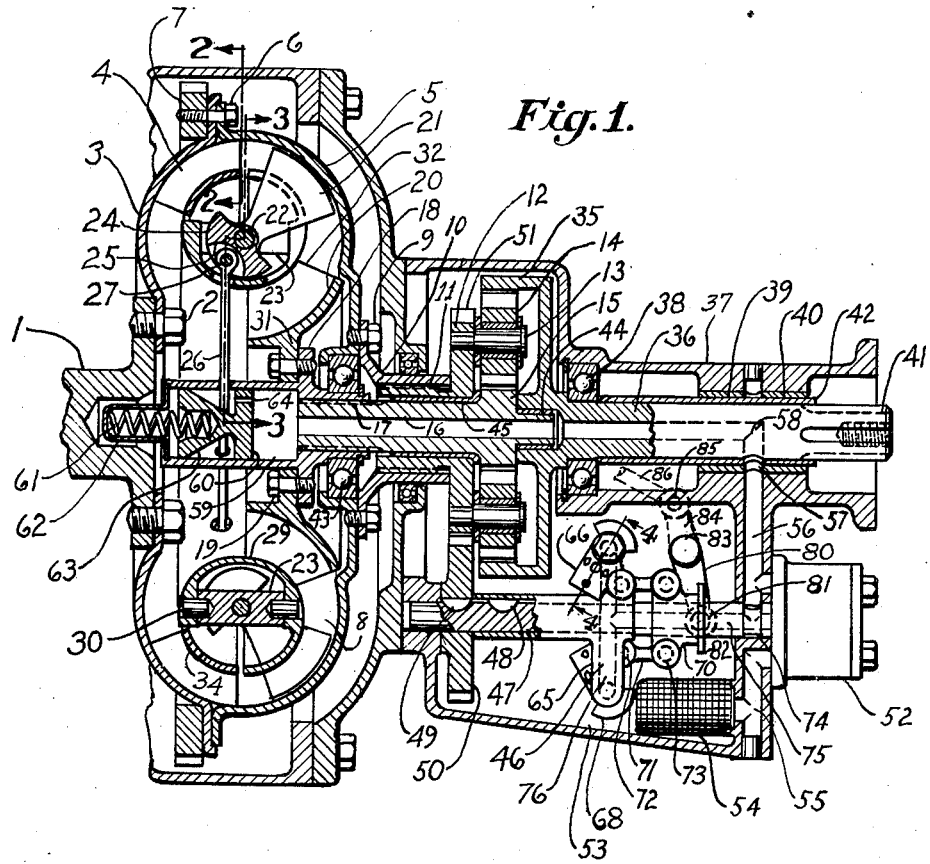
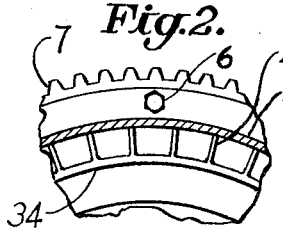
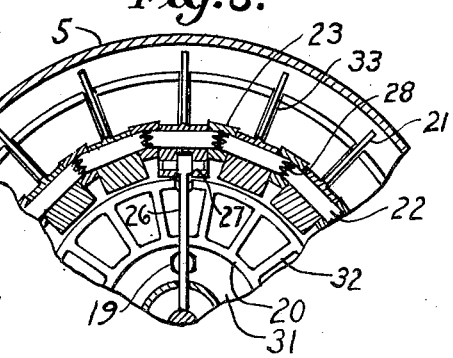
INVENTOR.
CLIFTON R. ROCHE Patented July 10, 1945

2,380,074

UNITED STATES PATENT OFFICE 2,380,074

FLUID FLYWHEEL TRANSMISSION

Clifton R. Roche, Los Angeles, Calif.

Application August 19, 1940, Serial No. 353,253

6 Claims. (Cl. 60—54)

My invention relates to automatic variable speed transmissions, and relates particularly to transmissions using the inertia of a rotating fluid as means for transferring power from one member to another, such as a fluid flywheel.

One of the objects of my invention is to provide a transmission with an infinite number of ratios, instead of the customary three as in the conventional automobile transmission.

A further object of my invention is to provide a device for operating the fluid flywheel at comparatively high speeds, thereby increasing the inertia of the rotating fluid, thus decreasing the required size of the fluid flywheel.

A further object of my invention is to provide a transmission with an infinite number of ratios, and means for automatically selecting, and shifting to, the required ratio.

Further objects and advantages of the invention will be made evident throughout the following part of the specification.

Referring to the drawing which is for illustrative purpose only,

Fig. 1 is a vertically longitudinally sectioned view through a preferred embodiment of my invention.

Fig. 2 is a fragmentary cross section on a plane represented by the line 2—2 of Fig. 1.

Fig. 3 is a fragmentary cross section on a plane represented by the line 3—3 of Fig. 1.

Fig. 4 is a sectioned view of one of the control valves taken on a plane represented by the line 4—4 of Fig. 1.

Referring to the drawing, my invention includes a drive member 1, which if used on an automobile having an engine, may be the crank shaft of the engine. Bolted to the drive member by means of bolts 2 is a driven element 3 which includes a set of blades 4. A housing 5 is bolted to the driven element 3 by the bolts 6, which may also hold a starting gear 7 of an engine, forming a compartment 8 which may retain oil or other operating fluid. Bolted to the housing 5 by bolts 9 is a bracket 10 whose splines 11 rotate a gear carrier 12. Thus by rotating the drive member 1, the gear carrier 12 will be rotated.

Studs 13 are securely fastened in the gear carrier 12, upon which are rotatively mounted planet gears 14, which mesh with a sun gear 15 which has an extending shaft 16. Mounted upon shaft 16 and held in rotation by splines 17 is a driving flange 18 to which is securely fastened by bolts 19, a driving element 20.

The driving element 20 includes a movable set of blades 21, in which are securely fastened pins 22. These pins are mounted in a bracket 23 forming a pivot center around which the blades 21 can swing. As the pivotal mountings for the blades are at right angles to the surfaces of the blades, the effective diameter that the blades have on the fluid flywheel can be varied, and as the planes of the blades are in line with the axis of the fluid flywheel, any construction that radially moves the effective position of the blades, or that moves the position of the blades along the line in which their surfaces extend for changing their effective diameter, or any construction that may change their effective diameter, may be used. The blades 21 are counterbalanced by means of weights 24, and one of every several weights has a slot 25 to receive an adjustment rod 26, which is pivoted to the blades 21 by a pin 27.

On the ends of the pins 22 are teeth 28, and one pin's teeth are in mesh with the next pin's teeth, and thus all the blades will swing inwardly or outwardly together according to adjustment of the adjustment rods 26.

The brackets 23 are fastened to a ring shaped member 29, of the driving element, by pins 30 and this ring shaped part is supported on a hub portion 31, of the driving element, by ribs, or fixed blades 32. The ring shaped member 29 has slots 33 to allow the blades 21 to swing completely out, or into-between the ribs 32.

In order to maintain a smooth flow of fluid around the ring shaped member, a continuation of the ring is formed by a ring 34 which is fastened to the set of blades 4 of the driven element. Thus an annular chamber is formed around the ring shaped member, removing the pivotal mountings, and other parts, from the main working flow of the fluid, and allowing a smooth flow of fluid past the blades.

Thus a fluid flywheel is formed with a set of driving blades and a set of driven blades, and the effective diameter of one set of blades adjustable in relation to the effective diameter of the other set of blades.

To explain the action of my invention, assume the blades 21 to be swung into-between the ribs 32. This gives a minimum effective diameter, as the compartment 8 is now free of blades between the ribs 32 and the blades 4. Now suppose the shaft 16 is driven at a high rate of speed. This will cause a particle of the fluid within the blades 21, and the ribs 32 to rotate at this high rate of speed giving it kinetic energy. The centrifugal force also causes the particle of fluid to move out away from the blades around the ring shaped part 29, into that portion of the compartment 8 which is free of blades. Since the kinetic energy of the revolving particle of fluid remains the same and its diameter of rotation increases, as it moves away from the ribs 32 toward the blades 4, it follows that its speed of rotation must be reduced, and when it comes in contact with the blades 4, its kinetic energy is picked up by the driven blades 4 which have a relatively large effective diameter, so the speed of rotation of the driven element 3 will be reduced compared to the speed of the shaft 16.

If the blades 21 are moved outwardly to their maximum effective diameter, the effective diameter of the driving element will equal the effective diameter of the driven element and the ratio will be substantially one to one, and any ratio between can be obtained by adjusting the effective diameter of the movable set of blades. Such a device therefore, incorporates therein a fluid flywheel having means for variable speed ratios of stepless regulation.

This principle can be demonstrated by a skater who is spinning around like a top. If his arms are extended he will spin at a slow speed, but if his arms are drawn in, he will spin at a high speed, and he can control his speed by the effective diameter of his arms.

I provide a novel planetary gear arrangement to increase the speed of the driving element as the required ratio is increased, and which also acts as a means of obtaining ratios from infinity to one to one, thereby decreasing the required size of the fluid flywheel.

The planet gears 14 mesh with the teeth of a driven gear 35, which may be an internal gear and which has an extending shaft 36 which is the driven shaft of the transmission. This shaft is rotatively mounted in a housing 37 by bearings 38, 39 and 40. The driven shaft 36 may include splines 41 to drive a reverse gear and clutch, or other desired mechanism, not shown, but which may abut against a spacer sleeve 42 which locks the inner race of bearing 38 on the driven shaft 36.

Bearings 43 and 44 are provided to hold the sun gear 15 and shaft 16 in axial alignment, and a bearing 45 is provided as a guide for the gear carrier 12.

The relative sizes of the sun gear in respect to the planet gears may be selected so as to obtain about a two and one-half to one ratio between the planet gear carrier 12, and the sun gear; that is for each revolution of the planet gear carrier 12, the sun gear 15 will make two and one-half revolutions if the driven gear 35 is held stationary. Therefore, if the effective diameter of the blades of the driven element in respect to the effective diameter of the blades of the driving element will give a ratio of two and one-half to one, there will be no rotation to the driven shaft 36 regardless of the speed of the drive member 1, so that the ratio between the drive member 1 and the driven shaft 36 is infinity, and the ratio of the transmission is infinity.

If the blades of the driving element are adjusted to obtain a one to one ratio for the fluid flywheel, the planet gear carrier 12 and the sun gear 15 will rotate at substantially the same speed which necessitates the driven gear 35 and the driven shaft 36 to rotate at this same speed and therefore the ratio of the transmission is one to one. Therefore, by adjusting the effective diameter of the blades, any desired ratio for the transmission can be obtained from infinity to one to one.

Also the sun gear that drives the driving element must always rotate at least as fast as the drive member, and as larger ratios are approached the driving element may rotate as much as two and one-half times the drive member speed. Thus both elements of the fluid flywheel are always rotating at relatively high speeds, thereby allowing the use of a fluid flywheel of comparatively small size.

In order to automatically control the ratio of the transmission, I provide a governor 46 which is mounted for rotation on a shaft 47 by a key 48. This shaft is driven through a key 49 by a gear 50 whose teeth mesh with gear teeth 51 which are a part of the gear carrier 12. The shaft 47 also serves to drive a fluid pump 52 which draws in fluid from a sump 53 through a strainer 54 and through a passage 55. The pump forces the fluid under pressure to passage 56 which leads to a space 57 between the bearings 39 and 40. A passage 58 always registers with the space 57 and the fluid under pressure from the pump can continue through the hollow shaft 16 to a cylindrical compartment 59. The pressure of the fluid acts on a piston head 60 which is balanced by the pressure of a spring 61 that is held in a container 62.

A cone shaped extension 63 extends from the piston against which the control rods 26 abut, due to the balance of the centrifugal force of the blades 21 being slightly greater than that of the counterweights 24.

If the pressure of the fluid in the compartment 59 is increased, the piston will be forced to the left, and the control rods 26 will allow the centrifugal force to rotate the blades 21 to a greater effective diameter, and if the pressure in compartment 59 is decreased, the spring 61 will force the cone to the right so as to move the control rods and rotate the blades 21 to a smaller effective diameter.

A small hole 64 allows some of the fluid to escape which keeps the compartment 8 filled with fluid and the excess fluid is allowed to escape from compartment 8 through a passage (not shown) under the splines 11 and flows back into the sump 53.

The governor is constructed with arms 65, having extensions 67 upon which may swing valve bodies 66. To prevent the centrifugal force from acting to swing the valve bodies, counterweights 68 are provided. In each of the valve bodies is a valve 69 which is forced against a valve seat 66a, partially by means of a spring 87, and partially due to the centrifugal force caused by the weight of the valve 69 being rotated about the axis of the shaft 47. A shifting bracket 70 is linked to the valve bodies by links 71 and pins 72 and 73, so that moving the shifting bracket to the right will swing the valve to a vertical position whereas moving the shifting bracket to the left will swing the valve to a horizontal position. When in the vertical position the full effect of the centrifugal force acts to thrust the valve against the valve seat, whereas when in the horizontal position, none of the centrifugal force acts to thrust the valve against the valve seat.

The governor acts to regulate the fluid pressure on the piston 60, as the passage 56 registers with an annular groove 74 which communicates with a passage 75 and 76 and through to an annular groove 77 which communicates with a compartment 78 which is above the head of the valve 69, thus allowing the fluid pressure to act against the head of the valve, and thus this valve acts as a pressure regulator valve, for when the fluid pressure becomes great enough to overcome the force of the spring 87 and the centrifugal force of the valve, the valve will be forced from its seat 66a allowing the fluid to escape through the holes 79.

The shifting bracket 70 is moved to the right or left by a lever 80, in the end of which is a pin 81 with a slotted head that receives a ring 82 that is part of the bracket 70. The lever 80 is fastened to a shaft 83 which extends through to the outside of the housing 37. Outside the housing and fastened to the shaft 83 is a lever 84. Thus if the lever 84 is rocked, the position of the shifting bracket may be changed to the right or left.

When the governor is used in an automobile having a gasoline, or fuel operated engine, I prefer to connect the lever 84 with the engine throttle, or accelerator, so that by depressing the accelerator the lever 84 will be moved to shift the shifting bracket to the left. A control rod 86, leading from the accelerator pedal, is connected to the lever 84 by a pin 85, to accomplish this action. However, if the transmission is used to drive a variable speed supercharger on an aviation engine, the control rod 86 may connect with an altimeter control so as to control the speed of the supercharger according to the altitude.

The tendency of the governor is to increase the speed of the driven shaft 36 as the speed of the drive member 1 increases from a low speed to a higher speed, for if there is an increase in the speed of the drive member, the governor speed will also increase, which, due to the increase in centrifugal force, increases the pressure of the valve 69 against its seat, thus resulting in an increase in the fluid pressure against the piston head 60 which forces it to the left thereby allowing the effective diameter of the driving element to increase which as previously explained will decrease the ratio of the transmission which tends to increase the speed of the driven shaft 36.

However, if the lever 84 is moved to the right, the valve 69 will be shifted to a more horizontal position which decreases the effect of the centrifugal force tending to hold the valve 69 against its seat. Thus the fluid pressure against the piston head 60 will be less than when previously explained and thus will not have moved it as far to the left. Thus the effective diameter of the driving element will not be as great as when previously explained, and thus the speed of the driven shaft 36 will not be as great, for a corresponding speed of the drive member 1. As a specific example, with the lever 84 to the left, the drive member speed, in varying from 1000 to 2000 R. P. M., would cause the driven shaft to vary in speed from 0 to 2000 R. P. M., and if the transmission was being used to drive an aviation engine supercharger, this would be a high altitude setting for the lever 84. If the lever 84 is moved somewhat to the right, the drive member speed, in varying from 1000 to 2000 R. P. M., would cause the driven shaft to vary from 0 to 1000 R. P. M. This would be a lower altitude setting for the lever 84.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A fluid flywheel transmission of the character described including: a driving element with a set of blades, a driven element with a set of blades, fluid-actuated means for moving radially the effective position of one of the named set of blades in respect to the position of the other named set of blades in response to fluid pressure, a source of fluid under pressure, a conduit connecting said source of fluid to said fluid-actuated means, valve means for controlling the pressure of the fluid in the conduit, said valve means being arranged to rotate about an axis so placed that centrifugal force acts on the valve means to tend to vary its controlling effect on the pressure of the fluid, and drive means for rotating the valve means by connection with one of said elements.

2. A fluid flywheel transmission of the character described including: a driving element with a set of blades, a driven element with a set of blades, fluid-actuated means for moving radially the effective position of one of the named set of blades in respect to the position of the other named set of blades in response to fluid pressure, a source of fluid under pressure, a conduit connecting said source of fluid to said fluid-actuated means, valve means for controlling the pressure of the fluid in the conduit, said valve means being arranged to rotate about an axis so placed that centrifugal force acts on the valve means to tend to vary its controlling effect on the pressure of the fluid, drive means for rotating the valve means by connection with one of said elements, and means for manually controlling the effective centrifugal force acting on the valve means.

3. A transmission of the character described including: variable ratio driving means, means for changing from one ratio to another by variations in fluid pressure, a source of fluid under pressure, a conduit connecting said source of fluid with said means for changing ratio, a centrifugal governor including a centrifugally controlled rotating valve means in communication with said fluid pressure so as to control same, and means other than the speed of rotation for varying the effect of the centrifugal force upon the centrifugally controlled rotating valve means.

4. In a fluid flywheel transmission the combination of a casing for confining therein an operating fluid for the fluid flywheel, an element within the casing carrying a set of blades radially mounted in respect to the axis of the fluid flywheel, a set of pivotal mountings for fastening the blades to the said element, the axes of said pivotal mountings forming a closed polygonal line around the axis of the fluid flywheel, a ring shaped member enclosing the pivotal mounting so as to allow smooth flow of fluid past the blades, and means for rotating the blades about their pivotal mountings for radially moving the blades in respect to the axis of the fluid flywheel, said ring shaped member having slots to permit passage of the blades.

5. In a fluid flywheel, the combination of a casing for confining therein an operating fluid for the fluid flywheel; an element within the casing having a set of blades, said set of blades being adjustable in line with their surfaces for adjusting the effective diameter of the fluid flywheel; a ring shaped member having a wall of ring shaped cross section in a plane radial to the fluid flywheel and spaced away from the walls of the fluid flywheel to form a torus chamber for guiding the fluid in a smooth flow past the blades, and having a series of radial slots in the said ring shaped member through which the blades pass to permit the adjusting movement of the blades; and means to adjust the blades.

6. In a fluid flywheel transmission, the combination of a casing for confining therein an operating fluid for the fluid flywheel, a set of blades for the fluid flywheel, an element within the casing for supporting the set of blades cooperating with the fluid, pivotal mountings for attaching the set of blades in a swinging manner to the said element, said pivotal mountings having their axes in a plane perpendicular to the axis of the fluid flywheel for causing the swinging movement of the blades to adjust their effective surfaces radially away from, or toward the axis of the fluid flywheel, and adjusting means independent of the condition of rest or rotation of the said set of blades for adjusting the effective surfaces of the blades as aforesaid, said adjusting means being capable of effecting such adjustments while the fluid flywheel is in operation.

CLIFTON R. ROCHE.